No. 627,134. Patented June 20, 1899.
W. M. McDOUGALL.
SECONDARY BATTERY.
(Application filed Aug. 4, 1898.)
(No Model.)

WITNESSES:
Frank S. Ober
Gers Kennedy

INVENTOR
W. M. McDougall
BY
M. Rosenbaum
ATTORNEY

UNITED STATES PATENT OFFICE.

WILLIAM M. McDOUGALL, OF EAST ORANGE, NEW JERSEY.

SECONDARY BATTERY.

SPECIFICATION forming part of Letters Patent No. 627,134, dated June 20, 1899.

Application filed August 4, 1898. Serial No. 687,686. (No model.)

*To all whom it may concern:*

Be it known that I, WILLIAM M. McDOUGALL, a citizen of the United States, residing at East Orange, in the county of Essex and State of New Jersey, have invented certain new and useful Improvements in Secondary Batteries, of which the following is a full, clear, and exact description.

This invention relates to secondary batteries, the object in view being to provide a battery in which the internal resistance will be low, the surface of contact between the active material and the conductor of the plate will be large, the tendency of the active material to become detached and free from the plate will be reduced to a minimum, the weight of the plate will be small, and the tendency of the plate to warp or buckle will be slight.

In carrying out the invention I provide for the structure of the plate a case of non-conducting material, preferably a composition containing rubber. This casing, which is to contain within it the conducting portion of the plate, is made complete by a molding or any other desired process, and the conducting portion is then inserted into and sealed in place. The conducting portion is of special construction, as will hereinafter appear.

Figure 1:
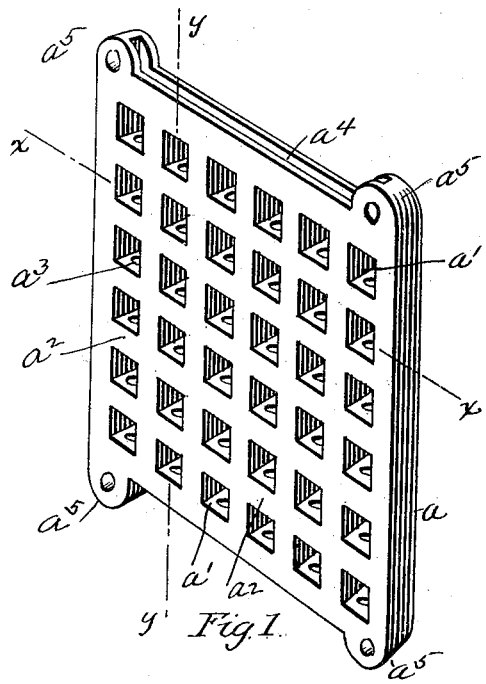
Figure 2:
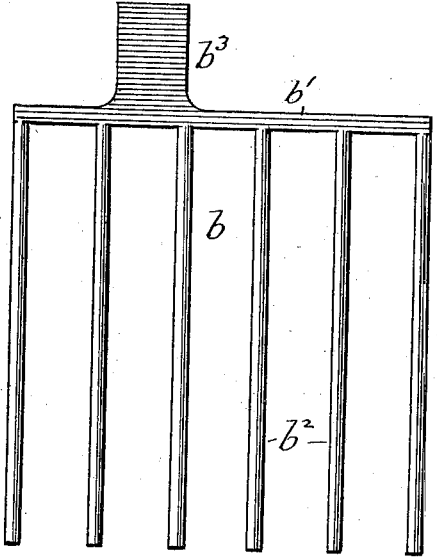
Figure 4:
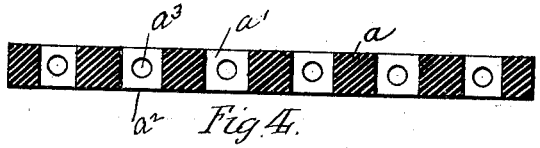
Figure 5:
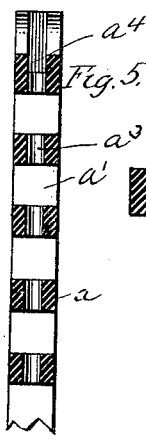
Figure 6:
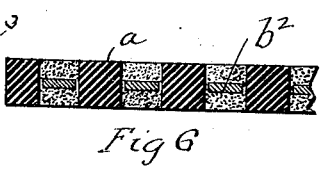
Figure 3:
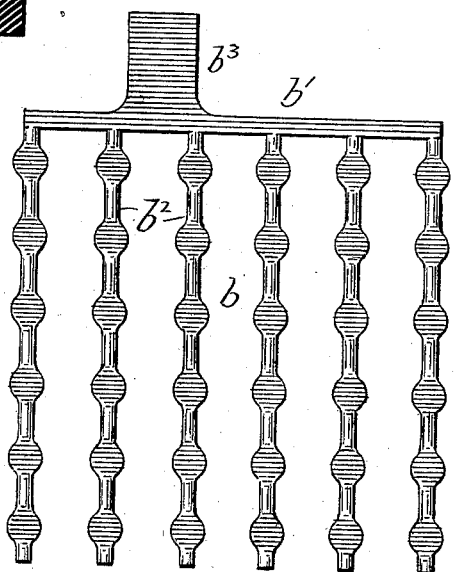

In the accompanying drawings, Figure 1 is a perspective view of the non-conducting casing of the plate. Fig. 2 is a side elevation of the conducting portion of the plate before it is inserted in the case. Fig. 3 is a side elevation of the conducting portion of the plate as it appears after it has been inserted in the case and given its final shape. Fig. 4 shows a sectional view of the non-conducting casing, taken on lines $x\,x$ of Fig. 1. Fig. 5 is a section on line $y\,y$ of Fig. 1. Fig. 6 is a sectional view of the plate completed with the active material in place.

Referring to the drawings by letter, $a$ represents a non-conducting casing, made, preferably by the molding process in a single piece, of a composition of rubber and some baser substance. The case is provided with a series of uniformly-disposed perforations $a'$, preferably rectangular and arranged in horizontal and vertical rows. The horizontal webs $a^2$ between the rows of perforations are perforated centrally, as shown at $a^3$, and the top and bottom cross-bars are also similarly perforated, thus providing straight passages through the interior of the plate from top to bottom. The top bar of the case is provided with a groove $a^4$, into which these vertical passages lead, and the corners of the plate will have lugs $a^5$ formed upon them, through which binding-rods may pass to secure the different plates of a cell together.

The conducting portion of the plate consists of a grid $b$, of lead, formed by a cross-bar $b'$ and thin bars or wires $b^2$, projecting at right angles therefrom. The cross-bar also carries a lug $b^3$, through which electrical connection with the plate may be effected. This conducting portion of the plate is applied to the casing by passing the bars or wires $b^2$ through the perforations which lead into the groove $a^5$ of the case, the wires being thus forced to pass through all of the rectangular spaces $a'$ in the case, the cross-bar $b'$ finally resting in the groove $a^5$, in which it is sealed or covered by asphaltum or similar non-conducting material to protect it from the solution of the cell. When the case and conducting portion of the plate have been thus placed together, those portions of the wires $b^2$ which are exposed in the openings $a'$ are flattened out or enlarged, as shown in Fig. 3, by means of any suitable die or tool. This not only prevents the metallic portion of the plate from moving within the other portion, but also increases the surface of the metallic portion. The plate thus constructed is ready for the active material, which is then filled into the openings $a'$ and pressed into intimate contact with the lead surfaces contained therein. The portions of the active material inserted from opposite sides will become knitted together around the lead portions and will thus firmly become anchored in the plate.

My invention is not limited to the making of the non-conducting case by a molding process, as it is obvious that it may be made in two parts, which after the conducting-grid has been placed between them may be sealed together by the application of heat and pressure.

Having described my invention, I claim—

1. In a secondary battery, a plate consisting of a casing of non-conducting material having chambers or passages formed entirely through it, in combination with a conducting portion in the form of a grid extending through the interior of said case and having the surface of those portions enlarged which are exposed in the chambers or passages of the case, substantially as described.

2. In a secondary battery a plate consisting of a non-conducting case having a groove in one edge and provided with chambers for the active material, a series of parallel perforations leading from said groove through the interior of the case, in combination with a conducting portion in the form of a grid, the bars of which pass through said perforations respectively, and a cross-bar of which rests in said groove, substantially as described.

3. In a secondary battery, a plate consisting of a case of non-conducting material having cells therein, a conducting portion confined within said case, portions of which are exposed in said cells, said exposed portions having enlarged surfaces for the purpose set forth.

In witness whereof I subscribe my signature in presence of two witnesses.

WILLIAM M. McDOUGALL.

Witnesses:
WM. A. ROSENBAUM,
GEO. S. KENNEDY.